April 3, 1956     E. W. KLEINSMITH     2,740,532
SADDLE-OUTFIT COLLAPSIBLE HANGER
Filed April 28, 1952
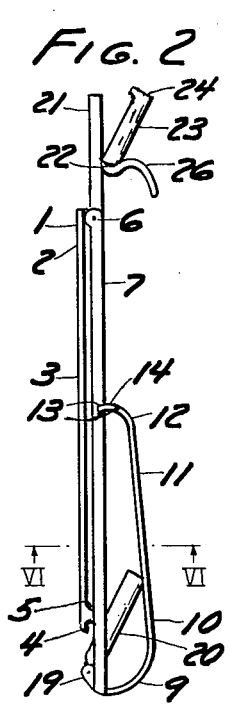
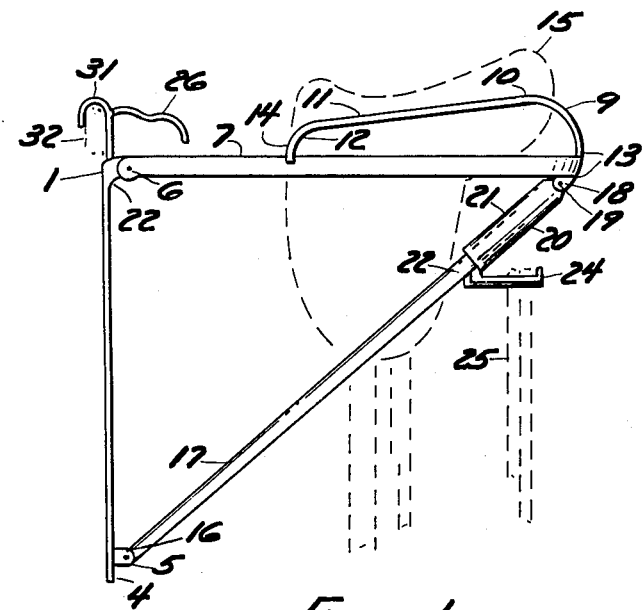
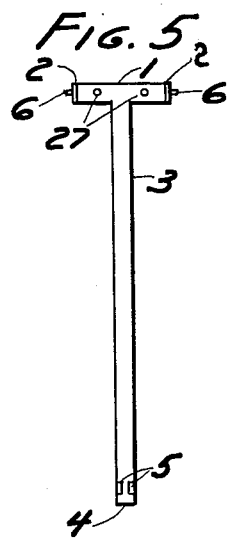
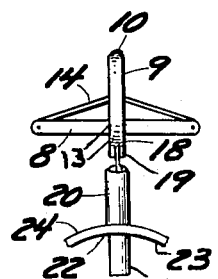
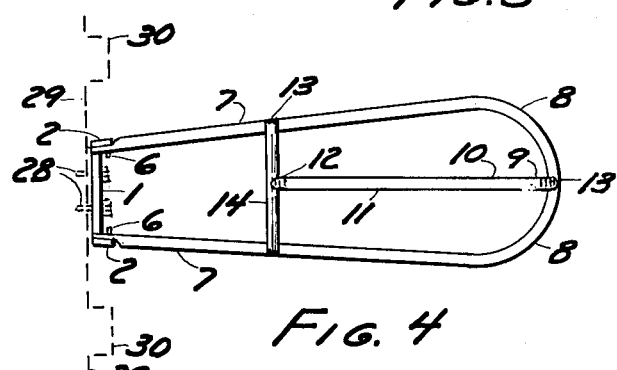
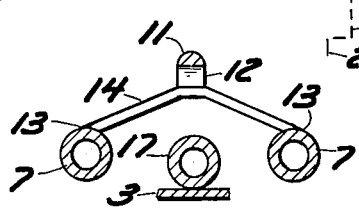
EARL W. KLEINSMITH
Inventor

United States Patent Office 2,740,532
Patented Apr. 3, 1956

2,740,532

SADDLE-OUTFIT COLLAPSIBLE HANGER

Earl W. Kleinsmith, Toledo, Ohio

Application April 28, 1952, Serial No. 284,772

1 Claim. (Cl. 211—104)

This invention relates to a support or rack for not-in-use horseback-riding equipment, especially during transporting of the horse, as in a trailer for taking the horse from one polo or other riding or racing location to another.

This invention has utility when incorporated in a collapsible bracket, even adaptable for ready set-up and shifting. In collapsed position, it may be sustained on a sidewall within the trailer, clear of the stall for the horse and spaced sufficiently upward from the trailer floor so that as snapped or adjusted to set-up assembly from the collapsed position, there is a tree or support for a saddle. Normally the saddle hanger or support is so configured that a saddle thereon does not tend to shift, even as the trailer is hauled about. However, should there be any shifting tendency, such is directed toward the mounting side wall carrying the hanger. The location of the saddle on the support is such that there is ready access before or after the saddle be placed or removed, to a hanger for the bridle portion of the harness with bit, reins and martingale. The normal placing of this harness for the horse's head is by looping the reins or other longer portions over the hanger to have such clear of the trailer floor.

Referring to the drawings:

Fig. 1 is a side elevation of an embodiment of the invention in a saddle-bridle hanger in set-up or in-use position;

Fig. 2 is a side view of the hanger of Fig. 1 collapsed;

Fig. 3 is a partial end elevation looking from the right toward Fig. 1;

Fig. 4 is a plan view of the saddle support section of the hanger of Fig. 1;

Fig. 5 is a front elevation of the carrying T-plate for the hanger; and

Fig. 6 is an enlarged scale section on the line VI—VI Fig. 2.

As a base for carrying the hanger there is provided a plate of general T-form having an upper horizontal member 1 terminating in a pair of aligned ears 2 (Fig. 5). From medially of the member 1 there extends downwardly a stem member 3 having near its lower end 4 a pair of ears 5.

Aligned pivot bearings 6 (Fig. 4) mount a tubular U-frame having leg portions 7 converging toward the bearings 6. Remote therefrom is a central bow-portion 8 of this U-frame. Centrally of the portion 8 and rising therefrom in an arc 9 is a saddle-centralizing tree or portion 10. The portion 10, preferably of half-oval wrought metal, has a slight downward pitch 11 to a more abrupt arc portion 12 welded to an inverted V or low pitch gable rigid strap 14 (Fig. 6) having weld connections 13 with the portions 7 somewhat beyond half way from weld connection 13 of the arc 9 with the bow portion 8 and the bearings 6. The purpose of the down-pitch 11 is that a saddle 15 astride the hanger seat or rib 10 is balanced by the lateral portions of the saddle seat resting on the portions 7. Inasmuch as there is a slight converging pitch of the rib 10, and portions 7 toward the bearings 6, any sliding tendency of the carried saddle due to vibration of the trailer in which it is mounted, will not shake the saddle off of the hanger but rather slide it further onto the hanger. However, normally, the saddle retains the position in which it is placed.

Axially parallel with the bearings 6 at the ears 2, is a bearing 16 for a strut rod tube 17. The welds 13 round off with the tubing of the U-frame 7, 8, against any harsh corners to scratch or mar the riding horse harness equipment. Just below the weld 13 for the arc 9, and in outward symmetry therewith is a weld 13 locating a pair of ears 18 for a pivot bearing 19 axially parallel to the bearings 6, 16. The bearing 19 mounts a tubular section or sleeve 20 adapted to telescope over free end 21 of the strut 17. A limit stop 22 on the strut 17 is abutted by the sleeve 20 in providing the set-up horizontal position for the U-frame 7, 8.

The central location of the strut 17 and the strut extension sleeve 20 forms a balanced structure to carry the load on the hanger. Furthermore, the central rib feature 9, 10, 11, provides hold-in for the sleeve 20 when the frame is in its collapsed position.

The stop 22 has an arch extension or flange 23 terminating in a slight ledge or rib 24. At set-up position, there is thus provided support for a bridle-bit harness 25 (Fig. 1), with its reins, and martingale, should there be such. The central location of the strut and sleeve 17, 20, positions the bridle supporting portion of this harness hanger unit below the saddle, thus minimizing the aisle space required for the in-use position of the hanger. Furthermore, the bridle harness 25 is conveniently accessible for placing and removal regardless of whether the saddle be on the hanger or off.

The collapsed position for the hanger, as noted (Fig. 2), is effective for the dropped-downward U-frame 7, 8, with the sleeve 20. The strut 17 is given an up-swing into parallelism with the T-stem portion 3, and there has the stop 22 ride over a spring arm device 26. There is thus a ready snap-up out-of-use positioning of the hanger. The device 26 is anchored with the plate 1, 3.

At holes 27 (Fig. 5) in the plate portion 1, bolts 28 may anchor the plate with a trailer inner-side wall 29 so that as little as possible of the hanger will project out beyond the studdings 30 when it is in its collapsed position. Other practice may be for bolts at the holes 27 to mount a pair of hooks 31 (Fig. 1) to be caught on a horizontal cleat or cross piece 32 at a proper height-from-the-floor distance on the inside of a trailer wall. With the adoption of this assembly, the hanger may be transferred from the trailer, say for stable use.

The hanger is rigid in use, light in weight, and of advantage for keeping riding horse equipment in exhibition condition.

What is claimed and it is desired to secure by Letters Patent is:

A collapsible hanger support for a saddle and bridle harness, said support comprising an upper horizontal member and a downwardly extending vertical stem member, the two members forming a T-shaped base, means for anchoring said base in a vertical position, a pair of aligned bearings, one at each end of the upper horizontal member, a third bearing on the lower end of the stem member, a U-shaped frame having legs and a central bow-portion, the legs of the U converging slightly at their free ends, means pivotally connecting the free ends of the U-shaped frame to the pair of aligned bearings, a cross-member fixed to and extending between the legs of the U-shaped frame intermediate the bow-portion and the free ends of the legs, an upwardly arcuate saddle centralizing member fixed at one end to the center of the bow-portion and at its other end to the central portion of the cross-member, a strut, means pivotally connecting one end of the strut in the third bearing, and strut extension means releasably connecting the opposite end of the strut to the U-shaped frame substantially at the center of the bow-portion to support the U-shaped frame, the last named means including a support element for receiving the bridle harness below the saddle which is supported by the upwardly arcuate centralizing member and the U-shaped frame.

References Cited in the file of this patent

UNITED STATES PATENTS

| | | |
|---|---|---|
| 764,952 | Lesser | July 12, 1904 |
| 971,710 | Wertz | Oct. 4, 1910 |
| 1,193,832 | Seymoure | Aug. 8, 1916 |
| 1,210,095 | Noack | Dec. 26, 1916 |
| 1,577,234 | Hubeny | Mar. 16, 1926 |
| 1,579,556 | McKenzie | Apr. 6, 1926 |
| 1,580,243 | Grunt | Apr. 13, 1926 |
| 1,837,692 | Thomas | Dec. 22, 1931 |
| 1,937,386 | Howe | Nov. 28, 1933 |
| 2,577,397 | Bailey | Dec. 4, 1951 |
| 2,670,110 | Harris | Feb. 23, 1954 |

FOREIGN PATENTS

| | | |
|---|---|---|
| 19,256 | Great Britain | of 1905 |
| 123,222 | Great Britain | of 1919 |
| 190,842 | Great Britain | Jan. 4, 1923 |